(12) United States Patent
Lee et al.

(10) Patent No.: US 11,661,354 B1
(45) Date of Patent: May 30, 2023

(54) UV LAMP SOCKET ASSEMBLY

(71) Applicant: ECOSET CO., LTD., Seoul (KR)

(72) Inventors: Jang Hee Lee, Incheon (KR); Chan Woo Lee, Incheon (KR)

(73) Assignee: ECOSET CO., LTD., Seoul (KR)

( * ) Notice: Subject to any disclaimer, the term of this patent is extended or adjusted under 35 U.S.C. 154(b) by 0 days.

(21) Appl. No.: 17/560,590

(22) Filed: Dec. 23, 2021

(30) Foreign Application Priority Data

Dec. 13, 2021 (KR) .......................... 10-2021-0177856

(51) Int. Cl.
*C02F 1/32* (2023.01)

(52) U.S. Cl.
CPC ........ *C02F 1/325* (2013.01); *C02F 2201/004* (2013.01); *C02F 2201/007* (2013.01); *C02F 2201/3227* (2013.01)

(58) Field of Classification Search
CPC ....... A61L 2/10; C02F 1/325; C02F 2201/007
See application file for complete search history.

(56) References Cited

U.S. PATENT DOCUMENTS

2013/0234037 A1\* 9/2013 Moglan .................. C02F 1/325
250/493.1

FOREIGN PATENT DOCUMENTS

| JP | 05 050082 U | 7/1993 |
|---|---|---|
| JP | H09 117761 A | 5/1997 |
| KR | 20 0144441 Y1 | 6/1999 |
| KR | 20 0414962 Y1 | 4/2006 |
| KR | 10 2014 0104621 A | 8/2014 |
| KR | 10 1440133 B1 | 9/2014 |
| KR | 10-1459376 B1 | 11/2014 |
| KR | 10 2273250 B1 | 7/2021 |

OTHER PUBLICATIONS

Office Action issued in KR patent application serial No. 10-2021-0177856 dated Mar. 11, 2022, with English machine translation.
Decision to Grant issued in KR patent application serial No. 10-2021-0177856 dated May 16, 2022, with English machine translation.

\* cited by examiner

*Primary Examiner* — Karabi Guharay
(74) *Attorney, Agent, or Firm* — Westman, Champlin & Koehler, P.A.; Amanda M. Prose

(57) ABSTRACT

Provided is a UV lamp socket assembly for quickly, easily and safely drawing out a UV lamp without stopping operation of a UV reactor. The UV lamp socket assembly includes a lamp socket part allowing a UV lamp to be fitted thereto, and having a latch formed in a side surface to pivot around; a lamp socket nut part allowing the UV lamp to be inserted therethrough, having an annular latching groove formed in a side surface and provided for attaching and detaching the latch, and allowing a portion of the lamp socket part to be inserted while the latch is latched into the latching groove; and a lamp socket holder part to be fixed to a frame of the UV reactor using a fastening part and to be fastened with the lamp socket nut part to support the lamp socket part.

5 Claims, 7 Drawing Sheets

UV LAMP SOCKET ASSEMBLY

CROSS-REFERENCE TO RELATED APPLICATION

This application claims priority to and the benefit of Korean Patent Application No. 10-2021-0177856 filed in the Korean Intellectual Property Office on Dec. 13, 2021, the entire contents of which are incorporated herein by reference.

BACKGROUND OF THE DISCLOSURE

Field of the Disclosure

The present disclosure relates to a UV lamp socket assembly for quickly, easily and safely drawing out a UV lamp without stopping operation of a UV reactor.

Related Art

Various organic matter treatment methods for treating organic matters in wastewater or sewage have been proposed.

First, methods using ozone, chlorine-based compounds such as chlorine gas, chlorine dioxide, and sodium hypochlorite, hydrogen peroxide, potassium permanganate, and potassium dichromate as oxidants are used for sterilization, decolorization, deodorization, Biochemical Oxygen Demand (BOD), Chemical Oxygen Demand (COD), and decomposition and removal of various organic substances at various water treatment sites.

When ultraviolet rays are radiated to an oxidant such as ozone or hydrogen peroxide, OH radical which is a strong oxidant is generated. A reaction of oxidatively decomposing contaminants using the OH radical is referred to as an advanced oxidation reaction, and a water treatment method using the advanced oxidation reaction is referred to as advanced oxidation process (AOP). As the advanced oxidation process, methods such as "ozone+hydrogen peroxide", "ozone+ultraviolet", "ozone+photocatalyst+ultraviolet", "hydrogen peroxide+ultraviolet", and "ozone+ultrasonic" have been well-known.

A water treatment apparatus for the advanced oxidation process relates to a technology for oxidizing and decomposing organic contaminants in contaminated water by generating OH radical with a strong oxidant as an intermediate. That is, the water treatment apparatus relates to a more advanced water treatment technology developed to decompose non-biodegradable matters such as synthetic detergents and pesticides, which are not easily decomposed by general treatment methods, or to treat highly concentrated contaminants in a short time. Due to the environmental pollution and the increase in non-biodegradable substances that cannot be treated by existing treatment methods, there are increasing demands for a large-capacity advanced oxidation process water treatment apparatus that exhibits excellent treatment efficiency and capable of effectively treating an increasing amount of contaminated water.

Figure 1:
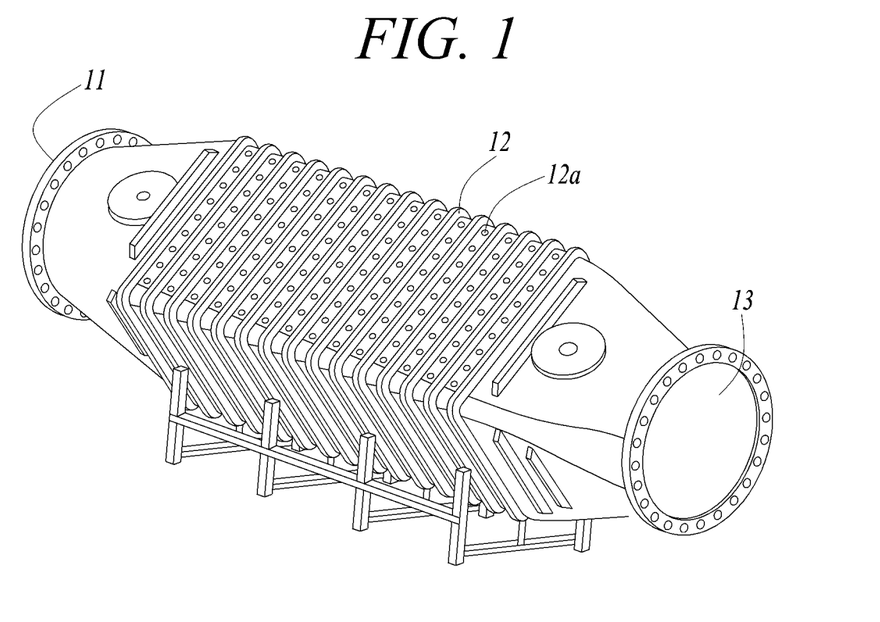
FIG. 1 is a perspective view showing a UV reactor of a general type.
Figure 2:
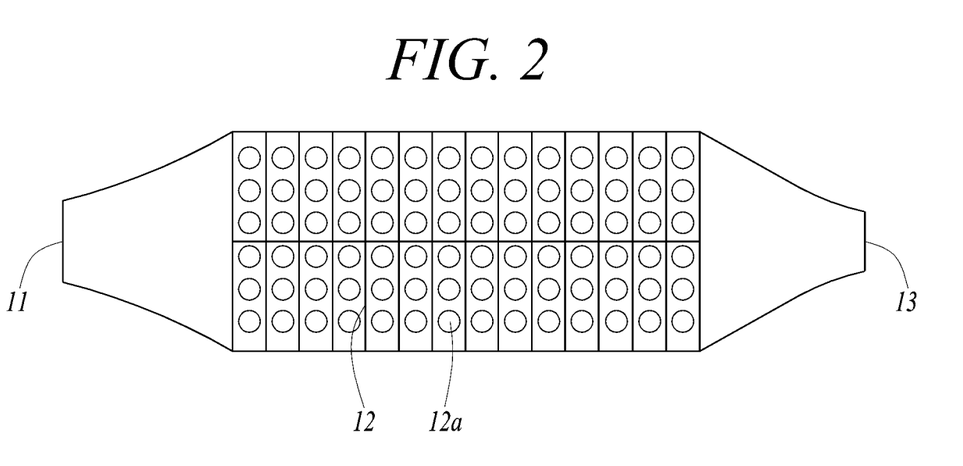
FIG. 2 is a plan view of FIG. 1.

FIG. 1 is a perspective view showing a UV reactor of a general type, and FIG. 2 is a plan view of FIG. 1. A UV reactor is a contaminated water treatment apparatus used in a large-capacity advanced oxidation process.

Referring to FIGS. 1 and 2, the UV reactor includes an inlet 11 through which water to be treated is introduced, a treatment region 12 where the introduced water to be treated is treated using a UV lamp module, and an outlet 13 through which the treated water is discharged. A plurality of UV lamp modules 12a is installed in the treatment region 12.

The UV lamp module 12a is inserted into a through hole formed in a surface of the treatment region 12, and an O-ring is hermetically mounted to a UV lamp module 12a in order to prevent the water to be treated in the treatment region 12 from leaking through a gap between the through hole and the UV lamp module 12a.

When it is time to replace the UV lamp in the UV lamp module 12a due to long-term use, the UV lamp module 12a should be drawn out from the through hole.

At this point, since the O-ring mounted to the UV lamp module 12a is stuck onto an inner wall of the through hole due to the long-term use, it is very difficult to draw out the UV lamp module 12a. In this case, if an operator forcibly draws the UV lamp module 12a, the O-ring may be damaged and the water to be treated in the UV reactor may leak due to high pressure, jeopardizing the safety of the operator.

In addition, the O-ring may be worn out due to long-term use. In this case, if the operator attempts to draw out the UV lamp module, the water to be treated in the UV reactor may leak due to high pressure, jeopardizing the safety of the operator.

PRIOR ART LITERATURE

Patent Literature

Korean Patent No. 10-1459376

SUMMARY OF THE DISCLOSURE

The present disclosure provides a UV lamp socket assembly for quickly, easily and safely drawing out a UV lamp without stopping the operation of the UV reactor.

In one aspect of the present disclosure, a UV lamp socket assembly is provided. The UV lamp socket assembly includes: a lamp socket part allowing a UV lamp extending in a direction of a first axis to be fitted thereto, connected to a power cable for supplying power to the UV lamp, and having a latch formed in a side surface of the lamp socket to pivot around a second axis orthogonal to the first axis; a lamp socket nut part allowing the UV lamp to be inserted therethrough, having an annular latching groove formed in a side surface of the lamp socket nut part and provided for attaching and detaching the latch, and allowing a portion of the lamp socket part to be inserted while the latch is latched into the latching groove; and a lamp socket holder part to be fixed to a frame of the UV reactor using a fastening part and to be fastened with the lamp socket nut part to support the lamp socket part.

The lamp socket part may include a lamp socket housing. A cable connector connected to the power cable for supplying power to the UV lamp may be formed in an inner upper side of the lamp socket housing. A lead connector connected to an electrode lead of the UV lamp may be formed in an inner lower side of the lamp socket housing. An O-ring and a backup ring may be formed in a dual structure in a lower portion of an outer surface of the lamp socket housing. The latch and a compression spring for elastically supporting the latch may be formed in an upper portion of the outer surface of the lamp socket housing.

A latching projection to be fitted to the latching groove may be formed in one side of the latch. The other side of the latch may be elastically supported by the compression spring.

A width of the latching groove may be formed to be larger than a width of the latching projection.

A first screw thread may be formed in an outer side of the lamp socket nut part. A second screw thread to be screw-engaged with the first screw thread may be formed in an inner surface of the lamp socket holder part.

The frame may be provided with a through hole through which a quartz glass tube accommodating the UV lamp is inserted. A dual-structured O-ring may be installed between the quartz glass tube inserted into the through hole and an inner wall of the frame.

Details of embodiments according to various aspects of the present disclosure are included in the detailed description below.

According to the embodiment of the present disclosure, it is possible to quickly, easily and safely draw the UV lamp without stopping the operation of the UV reactor.

DESCRIPTION OF EXEMPLARY EMBODIMENTS

The present disclosure may include various modifications and embodiments, and therefore, the present disclosure will be explained in detail by taking exemplary embodiments. However, this is not intended to limit the present disclosure to the particular exemplary embodiments, and it should be noted that the present disclosure is intended to include all variations, equivalents, and substitutions that are included in the technical scope of the idea of the present disclosure.

The terms and expressions used in the present disclosure are used only for the purpose of illustrating particular embodiments, and are not intended to limit the present disclosure. Unless stated otherwise, an expression of singularity is intended to include expressions of plurality. It should be noted that the terms "include" or "have" as used in the present disclosure are intended to denote the existence of any features, numerical values, steps, operations, constituent elements, parts, and combinations thereof described in the specification, but are not intended to preliminarily exclude the possibility of existence or addition of any one or more other features, numerical values, steps, operations, constituent elements, parts, and combinations thereof. Hereinafter, a UV lamp socket assembly according to an embodiment of the present disclosure will be described with reference to the drawings.

Figure 3:
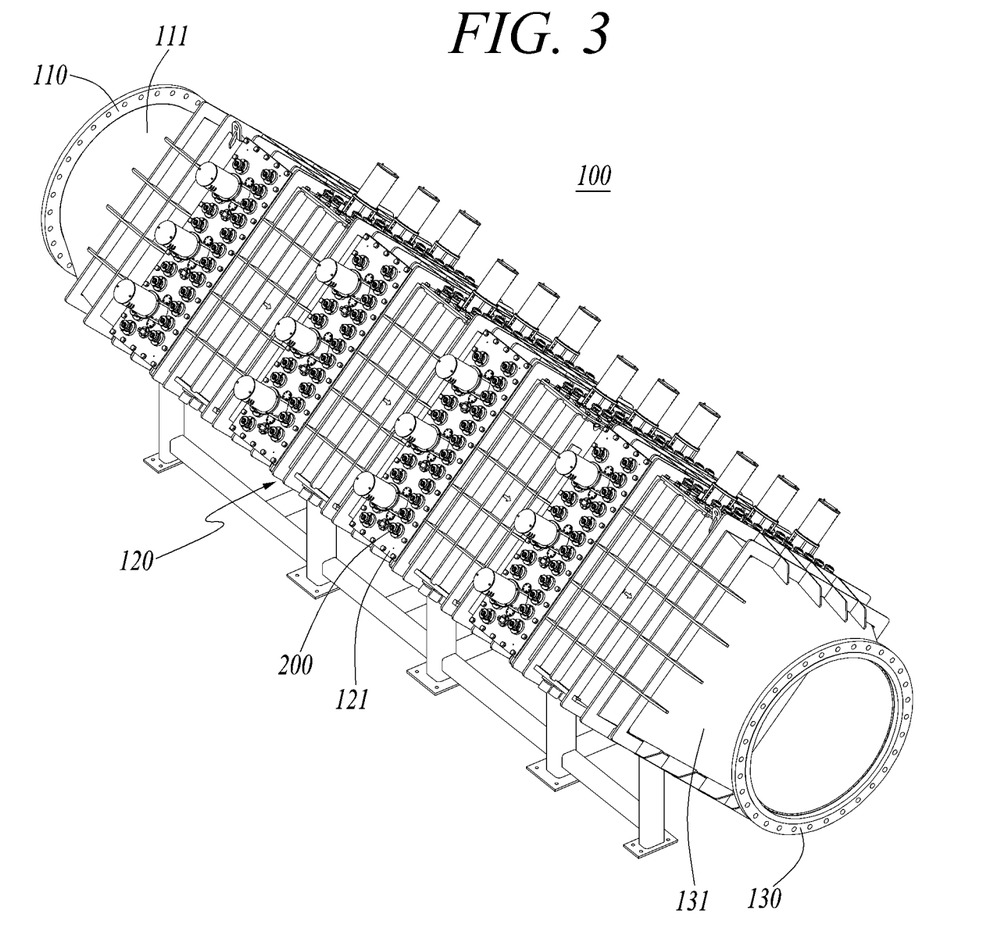
FIG. 3 is a perspective view showing a UV reactor equipped with a UV lamp module using a UV lamp socket assembly according to an embodiment of the present disclosure.
Figure 4:
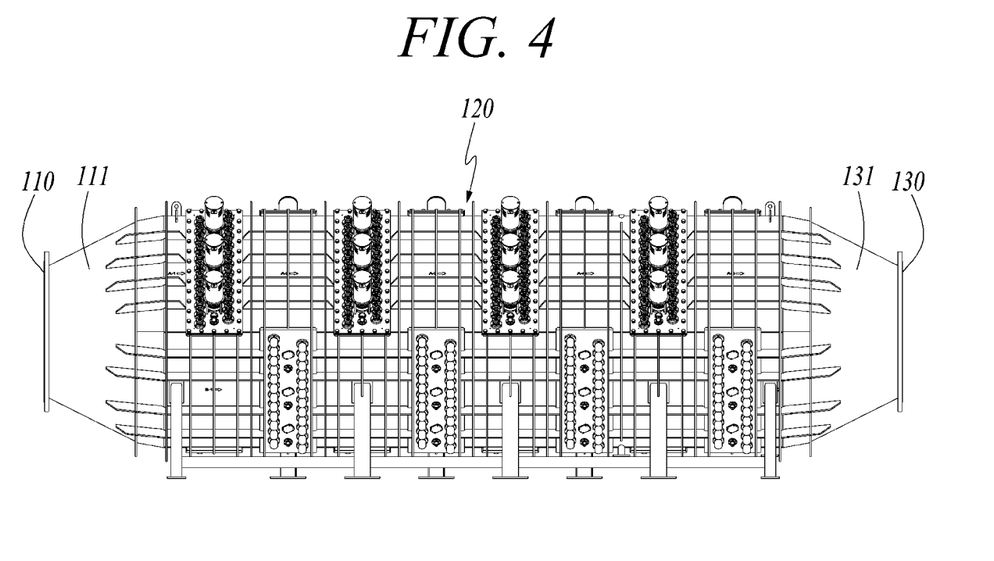
FIG. 4 is a plan view showing a UV reactor equipped with a UV lamp module using a UV lamp socket assembly according to an embodiment of the present disclosure.

FIG. 3 is a perspective view showing a UV reactor equipped with a UV lamp module using a UV lamp socket assembly according to an embodiment of the present disclosure, and FIG. 4 is a plan view showing a UV reactor equipped with a UV lamp using a UV lamp socket assembly according to an embodiment of the present disclosure.

Referring to FIGS. 3 and 4, a UV reactor 100 equipped with a UV lamp module using a UV lamp socket assembly according to an embodiment of the present disclosure may include an inlet 110, a treatment region 120, and an outlet 130.

The inlet 110 may be formed as an opening in a predetermined shape, for example, a circular shape, and water to be treated may flow into the treatment region 120 through the inlet 110. A first transition region 111 for spreading the flow of the water to be treated may be formed between the inlet 110 and the treatment region 120, so that the water to be treated can be uniformly introduced into the treatment region 120. The first transition region 111 is a fluid channel formed between the inlet 110 and the treatment region 120 and may be formed in a shape in which a cross-sectional area gradually increases from the inlet 110 to the treatment region 120.

The treatment region 120 is a region for treating the water to be treated using a UV lamp, and the water to be treated introduced through the inlet 110 is treated in the treatment region 120. The treatment region 120 is formed in a predetermined shape, for example, a rhombus shape. In the treatment region 120, UV lamp modules using a plurality of UV lamp socket assemblies 200 may be installed in a zigzag shape while forming rows and columns. A frame 121 for mounting the UV lamp modules using the UV lamp socket assemblies 200 may be installed on a surface of the treatment region 120. The frame 121 may have a plurality of through holes into which the UV lamp modules using the UV lamp socket assemblies 200 can be inserted. Reference numeral 122 indicates a drive motor for driving a wiper which, while reciprocating up and down, cleans a surface of a quartz tube forming a UV lamp module in the treatment region 120.

The outlet 130 may be formed as an opening in a predetermined shape, for example, a circular shape, and the water to be treated in the treatment region 120 is discharged to the outside through the outlet 130. A second transition region 131 for prompting the discharge of the water to be treated may be formed between the treatment region 120 and the outlet 130. The second transition region 131 is a fluid channel formed between the treatment region 120 and the outlet 130 and may be formed in a shape in which a cross-sectional area gradually decreases from the treatment region 120 to the outlet 130.

In the UV reactor 100 configured as above, the UV lamp socket assembly 200 allows only some of the components including the lamp socket in which the UV lamp is fitted thereto to be separated and drawn out in the treatment region 120. In doing so, it is possible to solve the problem caused by a leakage of water to be treated when a UV lamp module is drawn out in the case of using a conventional O-ring. This will be described with reference to FIGS. 5 to 7.

Figure 5:
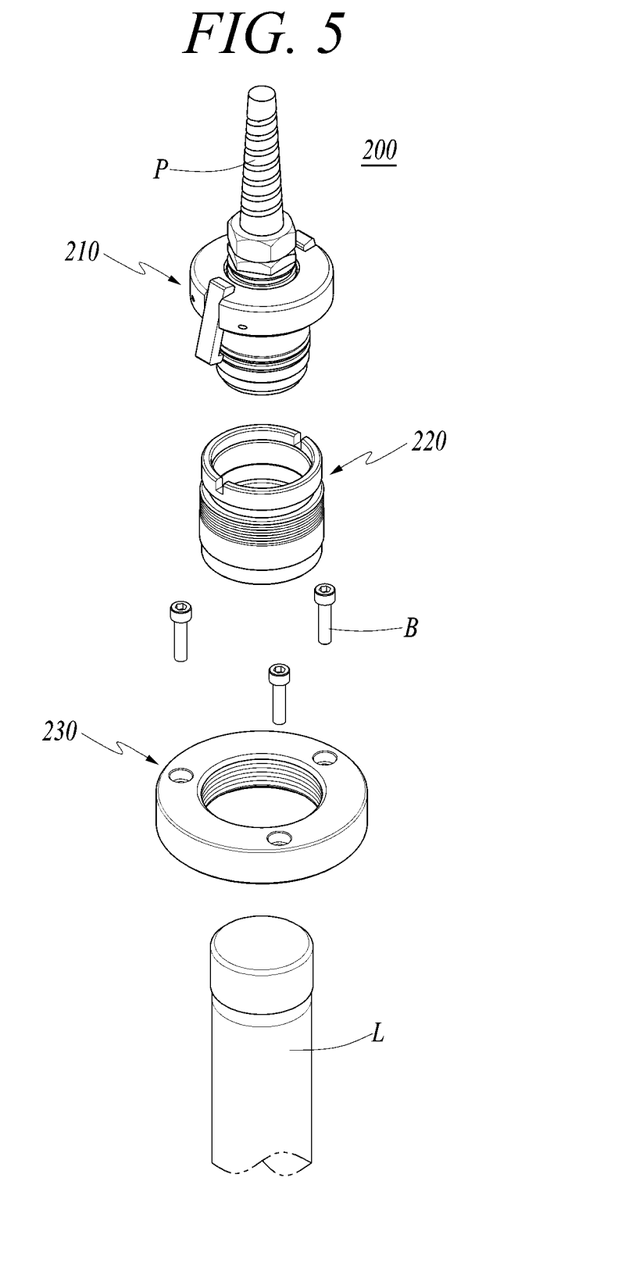
FIG. 5 is a perspective view showing a UV lamp socket assembly according to an embodiment of the present disclosure.
Figure 6:
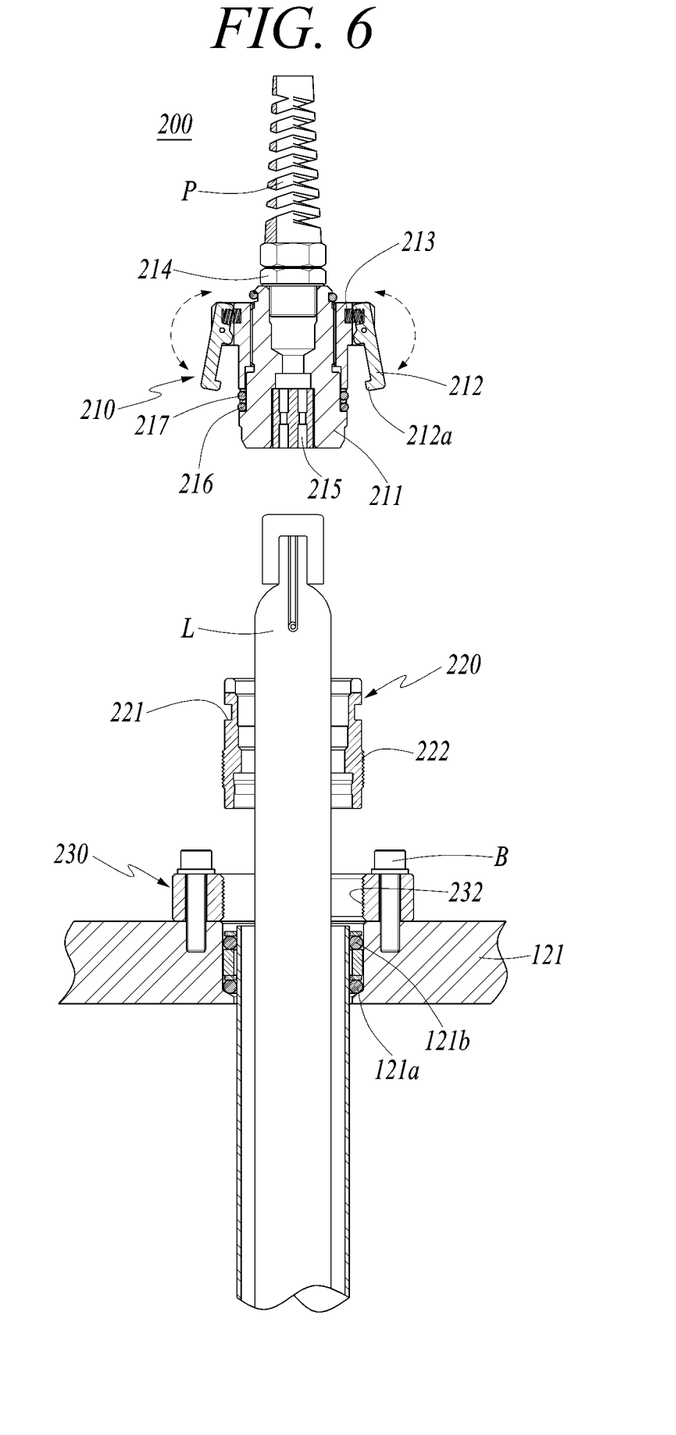
FIG. 6 is an exploded cross-sectional view of a UV lamp socket assembly according to an embodiment of the present disclosure.
Figure 7:
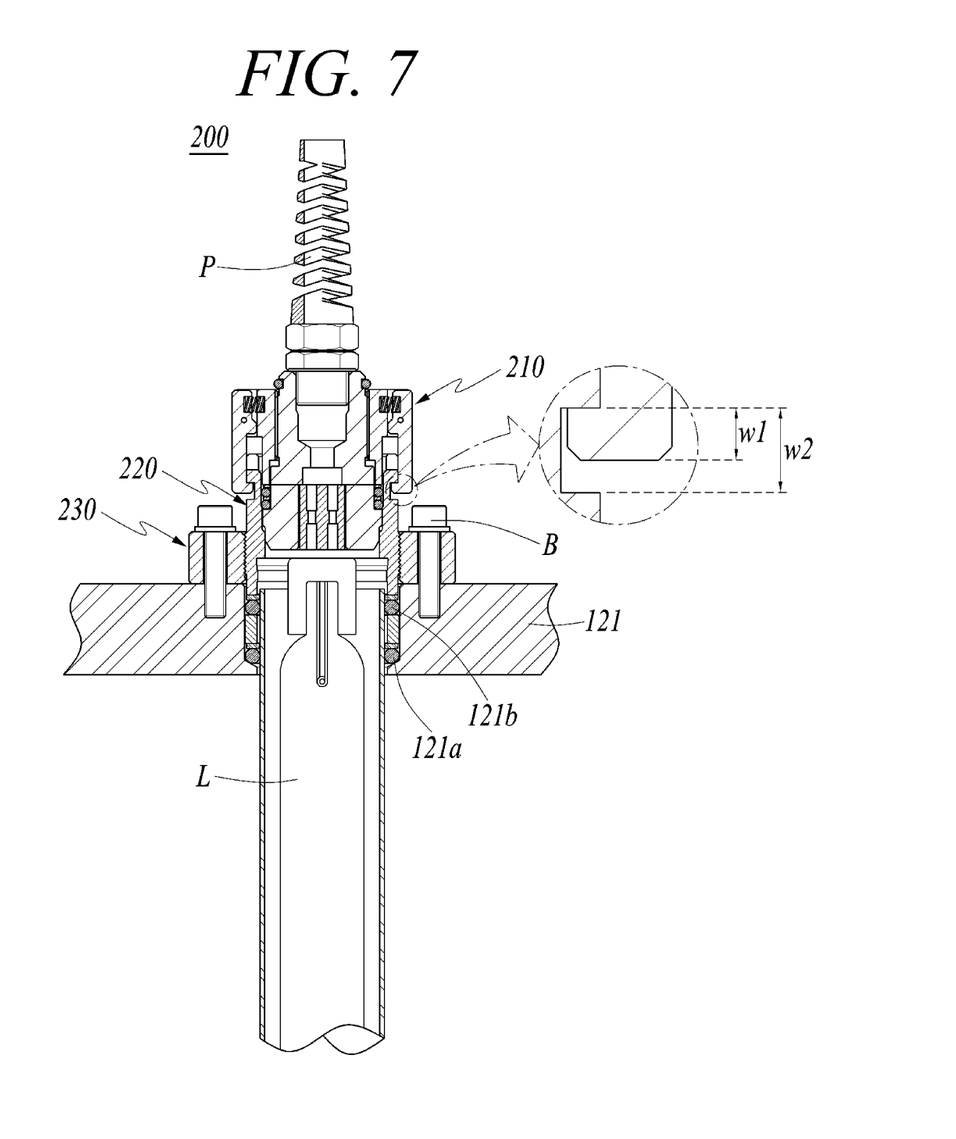
FIG. 7 is a cross-sectional view of a UV lamp socket assembly in a coupled state according to an embodiment of the present disclosure.

FIG. 5 is a perspective view showing a UV lamp socket assembly according to an embodiment of the present disclosure, FIG. 6 is an exploded cross-sectional view of a UV lamp socket assembly according to an embodiment of the present disclosure, and FIG. 7 is a cross-sectional view of a UV lamp socket assembly in a coupled state according to an embodiment of the present disclosure.

Referring to FIGS. 5 to 7, the UV lamp socket assembly 200 according to an embodiment of the present disclosure may include a lamp socket part 210, a lamp socket nut part 220, and a lamp socket holder part 230.

A UV lamp L extending in a first axial direction may be fitted to the lamp socket part 210 and inserted into the lamp socket nut part 220. In this case, the lamp socket part 210 and the lamp socket nut part 220 may be easily detached by a detaching part formed in a side surface of the lamp socket part 210.

The lamp socket part 210 may include a lamp socket housing 211, a latch 212, a compression spring 213, a cable connector 214, a lead connector 215, an O-ring 216, and a backup ring 217.

The lamp socket housing 211 may be formed in a cylindrical shape as a whole. The cable connector 214 connected to a power cable P for supplying power to the UV lamp L may be formed in an inner upper side of the lamp socket housing 211. The lead connector 215 connected to an electrode lead of the UV lamp L may be formed in an inner lower side of the lamp socket housing 211.

The O-ring 216 and the backup ring 217 may be formed in a dual structure in a lower portion of the outer surface of the lamp socket housing 211, so that a leakage of the water to be treated in the treatment region 120 can be doubly prevented. In addition, it is possible to prevent the water to be treated from leaking to the outside along the inside of the quartz glass tube Q when a quartz glass tube Q is damaged.

The latch 212 and the compression spring 213 may be formed in an upper portion of the outer surface of the lamp socket housing 211, that is, above the O-ring 216 and the backup ring 217. The latch 212 may be formed to be able to pivot about a second axis (which is the axis in a direction vertical to the ground in the drawings) orthogonal to an axial direction of the UV lamp L. A latching projection 212a that can be fitted into a latching groove 221 to be described later may be formed in one side (a lower side) of the latch 212, and the other side (an upper side) of the latch 212 may be elastically supported by the compression spring 213. When an operator presses the upper side of the latch 212, the latch 212 may rotate about the second axis upwards to press the compression spring 213, and when the operator releases the pressure, the latch 212 may rotate about the second axis downwards as the compression spring 213 is restored to its original position.

The UV lamp L may penetrate and be inserted into the lamp socket nut part 220, and the lamp socket nut part 220 may be easily detached from the lamp socket part 210 by a pivoting movement of the latch 212. In the lamp socket nut part 220, at least a portion of the lamp socket part 210 may be inserted.

The lamp socket nut part 220 may be formed in a hollow cylindrical shape with upper and lower surfaces open. In order to improve airtightness, the inside of the lamp socket nut part 220 may be formed in a shape corresponding to an external shape of the lamp socket housing 211.

An annular latching groove 221 may be formed in an outer surface of the lamp socket nut part 220. The latching groove 221 may be formed at a position where the latching projection 212a of the latch 212 is placed when a portion of the lamp socket part 210 is inserted and coupled to the lamp socket nut part 220. When the latching projection 212a is latched into the latching groove 221, the lamp socket part 210 and the lamp socket nut part 220 may be detachably coupled to each other. In this case, a width W2 of the latching groove 221 is preferably formed to be larger than a width W1 of the latching projection 212a for ease of fastening.

In addition, a first screw thread 222 may be formed in a lower portion of the annular latching groove 221 on the outer surface of the lamp socket nut part 220. The first screw thread 222 may be fastened to a second screw thread 232 to be described later.

The lamp socket holder part 230 may be fixed to the frame 121 of the UV reactor by a fastening part such as a bolt B. The lamp socket holder part 230 may be formed in a hollow cylindrical shape with upper and lower surfaces open. The second screw thread 232 may be formed in an inner side of the lamp socket holder part 230 to be engaged with the first screw thread 222 of the lamp socket nut part 220. The first screw thread 222 and the second screw thread 232 may be hermetically screw-engaged with each other to fix the lamp socket nut part 220 and the lamp socket holder part 230 while sealing the quartz glass tube Q accommodating the UV lamp L therein. As a result, the lamp socket holder part 230 may support the lamp socket part 210.

The frame 121 may have a through hole into which the quartz glass tube Q is inserted. A dual structure O-ring 121a and 121b may be installed between the quartz glass tube Q inserted into the through hole and an inner wall of the frame 121, so that a leakage of the water to be treated in the treatment region 120 to the outside is doubly prevented.

Next, a process of mounting the UV lamp module using the UV lamp socket assembly according to an embodiment of the present disclosure to the UV reactor will be described.

An operator may insert the quartz glass tube Q into the through hole of the frame 121 and mount the O-ring 121a and 121b between the quartz glass tube Q and the inner wall of the frame 121.

Then, the lamp socket holder part 230 may be mounted to the frame 121 of the UV reactor using the bolt B. Then, the first screw thread 222 of the lamp socket nut part 220 may be engaged with the second screw thread 232 of the lamp socket holder part 230 to couple the lamp socket nut part 220 to the lamp socket holder part 230.

Then, at a time of connecting the electrode lead of the UV lamp L to the lead connector 215 of the lamp socket part 210, the UV lamp L may be fitted to the lamp socket part 210 and inserted into the lamp socket nut part 220, so that the UV lamp L is placed within the quartz glass tube Q.

At this point, the operator may press the latch 212 to pivot upwards, and after the latch 212 is placed at the position of the latching groove 221, the operator may release the pressure to cause the latching projection 212a to be latched into the latching groove 221.

In this manner, the operator may be able to easily and quickly mount the UV lamp module using the UV lamp socket assembly 200 to the UV reactor 100.

When it is necessary to draw out the UV lamp L for maintenance such as inspection, repair, replacement, etc., the operator may proceed with a process of separating the UV lamp socket assembly from the UV reactor in the reverse order of the mounting process.

In this case, the operator may simply press the latch 212 to pivot upwards and be separated from the latching groove 221, and may then draw out the lamp socket part 210 in which the UV lamp L is inserted. Therefore, the process of drawing the UV lamp L may be performed more easily and quickly than in the related art.

In addition, even in a case where the O-ring 121a and 121b is worn out due to long-term use, the lamp socket nut part 220 and the lamp socket holder part 230 still remain fastened with each other while maintaining airtightness, and thus, it is possible to prevent the water to be treated in the UV reactor from leaking to the outside when the UV lamp L is drawn out.

Therefore, it is possible to quickly, easily and safely draw the UV lamp L without stopping the operation of the UV reactor.

Meanwhile, when the overall inspection of the UV lamp module is required due to long-term use, the inspection may be simply performed by stopping the operation of the UV reactor, separating the lamp socket nut part 220 from the lamp socket holder part 230, and then and separating the lamp socket holder part 230 from the frame 212 of the UV reactor.

While the present disclosure has been particularly shown and described with reference to exemplary embodiments thereof, it will be understood by those of ordinary skill in the art that various modifications and changes may be made therein through inclusion, alteration, removal or addition of elements without departing from the spirit and scope of the present disclosure as defined by the following claims.

What is claimed is:

1. A UV lamp socket assembly comprising:
   a lamp socket part allowing a UV lamp extending in a direction of a first axis to be fitted thereto, connected to a power cable for supplying power to the UV lamp, and having a latch formed in a side surface of the lamp socket to pivot around a second axis orthogonal to the first axis;
   a lamp socket nut part allowing the UV lamp to be inserted therethrough, having an annular latching groove formed in a side surface of the lamp socket nut part and provided for attaching and detaching the latch, and allowing a portion of the lamp socket part to be inserted while the latch is latched into the latching groove; and
   a lamp socket holder part to be fixed to a frame of the UV reactor using a fastening part and to be fastened with the lamp socket nut part to support the lamp socket part,
   wherein the lamp socket part comprises a lamp socket housing,
   wherein a cable connector connected to the power cable for supplying power to the UV lamp is formed in an inner upper side of the lamp socket housing,
   wherein a lead connector connected to an electrode lead of the UV lamp is formed in an inner lower side of the lamp socket housing,
   wherein an O-ring and a backup ring are formed in a dual structure in a lower portion of an outer surface of the lamp socket housing, and
   wherein the latch and a compression spring for elastically supporting the latch are formed in an upper portion of the outer surface of the lamp socket housing.

2. The UV lamp socket assembly of claim 1,
   wherein a latching projection to be fitted to the latching groove is formed in one side of the latch, and
   wherein the other side of the latch is elastically supported by the compression spring.

3. The UV lamp socket assembly of claim 2,
   wherein a width of the latching groove is formed to be larger than a width of the latching projection.

4. The UV lamp socket assembly of claim 1,
   wherein a first screw thread is formed in an outer side of the lamp socket nut part, and
   wherein a second screw thread to be screw-engaged with the first screw thread is formed in an inner side of the lamp socket holder part.

5. The UV lamp socket assembly of claim 1,
   wherein the frame is provided with a through hole through which a quartz glass tube accommodating the UV lamp is inserted, and
   wherein a dual-structured O-ring is installed between the quartz glass tube inserted into the through hole and an inner wall of the frame.

* * * * *